United States Patent
Mazahir et al.

(10) Patent No.: US 9,512,312 B2
(45) Date of Patent: *Dec. 6, 2016

(54) POLYARYLETHERKETONE COMPOSITION

(71) Applicant: Ticona LLC, Florence, KY (US)

(72) Inventors: Syed Mazahir, Irvin, TX (US); Kamlesh P. Nair, Florence, KY (US); Suresh Subromonian, Cary, NC (US); Joseph J. Grenci, Florence, KY (US); Ke Feng, Cincinnati, OH (US); Xinyu Zhao, Cincinnati, OH (US); David A. McIlroy, Cincinnati, OH (US); Kaushik Chakrabarty, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,241

(22) Filed: Aug. 14, 2015

(65) Prior Publication Data

US 2016/0053106 A1 Feb. 25, 2016

Related U.S. Application Data

(60) Provisional application No. 62/039,972, filed on Aug. 21, 2014.

(51) Int. Cl.
*C08G 65/48* (2006.01)
*C08L 71/08* (2006.01)
*C08L 71/00* (2006.01)
*C08G 63/60* (2006.01)
*C08L 67/00* (2006.01)

(52) U.S. Cl.
CPC ............ *C08L 71/08* (2013.01); *C08G 63/605* (2013.01); *C08L 71/00* (2013.01); *C08G 2650/40* (2013.01)

(58) Field of Classification Search
CPC .................................. C08G 65/48; C08L 71/10
USPC .................................................. 525/397, 471
See application file for complete search history.

(56) References Cited

U.S. PATENT DOCUMENTS

| | | |
|---|---|---|
| 3,814,869 A | 6/1974 | De Luca |
| 3,847,867 A | 11/1974 | Heath et al. |
| 3,850,885 A | 11/1974 | Takekoshi et al. |
| 3,852,242 A | 12/1974 | White |
| 3,855,178 A | 12/1974 | White et al. |
| 3,956,240 A | 5/1976 | Dahl et al. |
| 3,983,093 A | 9/1976 | Williams, III et al. |
| 4,161,470 A | 7/1979 | Galundann |
| 4,320,224 A | 3/1982 | Rose et al. |
| 4,438,236 A | 3/1984 | Cogswell et al. |
| 4,443,591 A | 4/1984 | Schmidt et al. |
| 4,657,990 A | 4/1987 | Daoust et al. |
| 4,816,556 A | 3/1989 | Gay et al. |
| 4,906,784 A | 3/1990 | Skoler |
| 5,011,894 A | 4/1991 | Robeson et al. |
| 5,025,082 A | 6/1991 | Kishiro et al. |
| 5,063,265 A | 11/1991 | Harris |
| 5,079,308 A | 1/1992 | Harris et al. |
| 5,079,309 A | 1/1992 | Harris et al. |
| 5,100,973 A | 3/1992 | Robeson et al. |
| 5,110,880 A | 5/1992 | Harris et al. |
| 5,143,985 A | 9/1992 | Robeson et al. |
| 5,143,986 A | 9/1992 | Reuter et al. |
| 5,145,938 A | 9/1992 | Towle |
| 5,155,203 A | 10/1992 | Darnell et al. |
| 5,171,796 A | 12/1992 | Harris et al. |
| 5,288,834 A | 2/1994 | Roovers et al. |
| 5,290,906 A | 3/1994 | Matsumura et al. |
| 5,334,642 A | 8/1994 | Koch et al. |
| 5,436,310 A | 7/1995 | Dahl et al. |
| 5,504,139 A | 4/1996 | Davies et al. |
| 5,616,680 A | 4/1997 | Linstid, III |
| 5,618,889 A | 4/1997 | Kumpf et al. |
| 5,681,888 A | 10/1997 | Nomura et al. |
| 5,843,541 A | 12/1998 | Alanko et al. |
| 6,069,223 A | 5/2000 | Liggat et al. |
| 6,114,492 A | 9/2000 | Linstid, III et al. |
| 6,514,611 B1 | 2/2003 | Shepherd et al. |
| 6,566,484 B2 | 5/2003 | Gharda et al. |
| 6,881,816 B2 | 4/2005 | Gharda et al. |
| 7,160,980 B2 | 1/2007 | Devine et al. |
| 7,217,780 B2 | 5/2007 | Toriida et al. |
| 7,368,526 B2 | 5/2008 | Yuan et al. |
| 7,407,609 B2 | 8/2008 | Brown |
| 7,608,648 B2 | 10/2009 | Meakin et al. |
| 7,786,245 B2 | 8/2010 | Richter et al. |
| 7,820,767 B2 | 10/2010 | El-Hibri et al. |
| 7,837,896 B2 | 11/2010 | Flath et al. |

(Continued)

FOREIGN PATENT DOCUMENTS

| | | |
|---|---|---|
| EP | 0 102 158 A2 | 3/1984 |
| GB | 2 237 810 A | 5/1991 |
| GB | 2 425 495 A | 11/2006 |
| GB | 2 439 208 A | 12/2007 |
| WO | WO 2004/058851 A1 | 7/2004 |
| WO | WO 2012/001131 | 1/2012 |

OTHER PUBLICATIONS

Abstract of Chinese Patent—CN1050615, Mar. 22, 2000, 1 page.
Abstract of Chinese Patent—CN1050616, Mar. 22, 2000, 1 page.
Abstract of Chinese Patent—CN1158319, Jul. 21, 2004, 1 page.
Abstract of Chinese Patent—CN1161975, Oct. 15, 1997, 1 page.
Abstract of Chinese Patent—CN1162602, Oct. 22, 1997, 1 page.
Abstract of Chinese Patent—CN1198453, Nov. 11, 1998, 1 page.
Abstract of Chinese Patent—CN1311263, Sep. 5, 2001, 1 page.
Abstract of Chinese Patent—CN1353125, Jun. 12, 2002, 1 page.
Abstract of Chinese Patent—CN1884330, Dec. 27, 2006, 1 page.
Abstract of Chinese Patent—CN1884331, Dec. 27, 2006, 2 pages.
Abstract of Chinese Patent—CN101157268, Apr. 9, 2008, 2pages.

(Continued)

*Primary Examiner* — Terressa Boykin
(74) *Attorney, Agent, or Firm* — Dority & Manning, P.A.

(57) ABSTRACT

A polymer composition that contains a polyaryletherketone and a liquid crystalline polymer that includes repeating units derived from naphthenic hydroxycarboxylic acids, naphthenic dicarboxylic acids, or a combination thereof in an amount of more than about 15 mol. % of the polymer is provided.

23 Claims, No Drawings

(56) References Cited

U.S. PATENT DOCUMENTS

| | | | |
|---|---|---|---|
| 7,875,234 | B2 | 1/2011 | Richter et al. |
| 7,906,574 | B2 | 3/2011 | Meakin et al. |
| 8,017,691 | B2 | 9/2011 | Richter et al. |
| 8,236,919 | B2 | 8/2012 | Wu et al. |
| 8,536,265 | B2 | 9/2013 | Meakin et al. |
| 8,575,298 | B2 | 11/2013 | Ono et al. |
| 8,629,232 | B2 | 1/2014 | Grant et al. |
| 8,637,583 | B2 | 1/2014 | Hermanutz et al. |
| 8,754,162 | B2 | 6/2014 | Maljikovic et al. |
| 8,813,332 | B2 | 8/2014 | Leibfried et al. |
| 8,865,281 | B2 | 10/2014 | Axelrad et al. |
| 8,889,824 | B2 | 11/2014 | Franssen et al. |
| 8,906,259 | B2 | 12/2014 | Kim |
| 8,926,862 | B2 | 1/2015 | Kim et al. |
| 8,932,483 | B2 | 1/2015 | Kim |
| 8,945,694 | B2 | 2/2015 | Aneja et al. |
| 8,981,034 | B2 | 3/2015 | Wu et al. |
| 9,000,087 | B2 | 4/2015 | El-Hibri et al. |
| 9,006,348 | B2 | 4/2015 | Aneja et al. |
| 9,011,998 | B2 | 4/2015 | Aneja et al. |
| 9,023,468 | B2 | 5/2015 | Towle |
| 9,062,163 | B2 | 6/2015 | Wang et al. |
| 9,102,792 | B2 | 8/2015 | Nair et al. |
| 9,145,499 | B2 | 9/2015 | El-Hibri et al. |
| 9,175,136 | B2 | 11/2015 | Louis |
| 2005/0100724 | A1 | 5/2005 | Seargeant |
| 2007/0265414 | A1 | 11/2007 | Richter et al. |
| 2008/0312387 | A1 | 12/2008 | El-Hibri et al. |
| 2009/0048379 | A1 | 2/2009 | Weinberg et al. |
| 2009/0069511 | A1 | 3/2009 | Thomas et al. |
| 2009/0092827 | A1 | 4/2009 | Robinson |
| 2009/0131582 | A1 | 5/2009 | Grant et al. |
| 2009/0137724 | A1 | 5/2009 | Taguchi et al. |
| 2010/0024695 | A1 | 2/2010 | Difrancia et al. |
| 2011/0003163 | A1 | 1/2011 | Wood |
| 2011/0213115 | A1 | 9/2011 | Louis |
| 2012/0160829 | A1 | 6/2012 | Dufaure et al. |
| 2012/0270022 | A1 | 10/2012 | Alting et al. |
| 2013/0025734 | A1 | 1/2013 | Kuhmann et al. |
| 2013/0032240 | A1 | 2/2013 | Kuhmann et al. |
| 2013/0056108 | A1 | 3/2013 | Wood et al. |
| 2013/0306188 | A1 | 11/2013 | Wood et al. |
| 2014/0072739 | A1 | 3/2014 | Meakin et al. |
| 2014/0128566 | A1 | 5/2014 | Grant et al. |
| 2014/0243485 | A1* | 8/2014 | Nair ............... C08J 5/10 525/471 |
| 2014/0322441 | A1 | 10/2014 | Mathieu et al. |
| 2016/0053107 | A1* | 2/2016 | Mazahir ............ C08L 61/16 525/397 |

OTHER PUBLICATIONS

Abstract of Chinese Patent—CN101186695, May 28, 2008, 1 page.
Abstract of Chinese Patent—CN101215404, Jul. 9, 2008, 2 pages.
Abstract of Chinese Patent—CN101225555, Jul. 23, 2008, 2 pages.
Abstract of Chinese Patent—CN101302335, Nov. 12, 2008, 2 pages.
Abstract of Chinese Patent—CN101367994, Feb. 18, 2009, 2 pages.
Abstract of Chinese Patent—CN101387017, Mar. 18, 2009, 2 pages.
Abstract of Chinese Patent—CN101466770, Jun. 24, 2009, 1 page.
Abstract of Chinese Patent—CN101475729, Jul. 8, 2009, 2 pages.
Abstract of Chinese Patent—CN101486784, Jun. 16, 2010, 1 page.
Abstract of Chinese Patent—CN101608017, Dec. 23, 2009, 1 page.
Abstract of Chinese Patent—CN101831177, Sep. 15, 2010, 2 pages.
Abstract of Chinese Patent—CN 102161739, Aug. 24, 2011, 2 pages.
Abstract of Chinese Patent—CN102250446, Nov. 23, 2011, 2 pages.
Abstract of Chinese Patent—CN102321338, Jan. 18, 2012, 2 pages.
Abstract of Chinese Patent—CN102337019, Feb. 1, 2012, 2 pages.
Abstract of Chinese Patent—CN102344662, Feb. 8, 2012, 2 pages.
Abstract of Chinese Patent—CN102407079, Apr. 11, 2012, 2 pages.
Abstract of Chinese Patent—CN102653584, Sep. 5, 2012, 2 pages.
Abstract of Chinese Patent—CN102775726, Nov. 14, 2012, 2 pages.
Abstract of Chinese Patent—CN102827455, Dec. 19, 2012, 2 pages.
Abstract of Chinese Patent—CN102898808, Jan. 30, 2013, 2 pages.
Abstract of Chinese Patent—CN102942780, Feb. 27, 2013, 2 pages.
Abstract of Chinese Patent—CN103013107, Apr. 3, 2013, 1 page.
Abstract of Japanese Patent—JP5305803, Oct. 2, 2013, 1 page.
Abstract of Japanese Patent—JPH04220425, Aug. 11, 1992, 2 pages.
Abstract of Japanese Patent—JPH04283231, Oct. 8, 1992, 2 pages.
Abstract of Japanese Patent—JPH05192985, Aug. 3, 1993, 2 pages.
Abstract of Japanese Patent—JPH069774, Jan. 18, 1994, 2 pages.
Abstract of Japanese Patent—JP2001234053, Aug. 28, 2001, 2 pages.
Abstract of Japanese Patent—JP2002284980, Oct. 3, 2002, 1 page.
Abstract of Japanese Patent—JP2004175995, Jun. 24, 2004, 1 page.
Abstract of Japanese Patent—JP2010070658, Apr. 2, 2010, 1 page.
Abstract of Japanese Patent—JP2010095613, Apr. 30, 2010, 1 page.
Abstract of Japanese Patent—JP2010095614, Apr. 30, 2010, 1 page.
Abstract of WIPO Patent—WO2007109932, Oct. 4, 2007, 2 pages.
China Papers, Molecular Design and Characterization of Poly(Aryl Ether Ketone)s and Poly(Aryl Ether Sulfone)s Containing Naphthalene, Dissertation Abstract, Jul. 25, 2010, 2 pages.
Sun Qin Min, Synthesis and Properties of Poly )Aryl Ether Ketone) Copolymers Containing Phthalazinone Moieties, Dissertation Abstract, 2008, 3 pages.
Mingzhong Cai et al., Synthesis of poly(aryl ether kctone)s containing diphenyl moieties by electrophilic Friedel-Crafts solution polycondensation, Article, Dec. 17, 2008, 6 pages.
Yan Gao et al., Synthesis and Characterization of Soluble Copoly(ether ketone)s Containing Double Bonds, Article, Jul. 25, 2002, 6 pages.
Yaming Niu et al., Synthesis and Properties of Poly(Aryl Ether Ketone) Copolymers Containing 1,4-Naphthalene Moieties, Journal of Macromolecular Science, Part A—Pure and Applied Chemistry, Apr. 2004, vol. A41, No. 10, pp. 1095-1103.
G Wang, Synthesis and Characterization of Poly (aryl ether ketone) Copolymers, College of Chemistry, Vikas Mittal (ed.) High Performance Polymers and Engineering Plastics, 2011, Chapter 10, 341-386).
Product Description of Victrex® PEEK 150P from Victrex plc, Jul. 2014, 1 page.
Product Description of Victrex® PEEK 150G / 151G from Victrex plc, Jul. 2014, 2 pages.
International Search Report and Written Opionion for PCT/US2015/45172, dated Nov. 19, 2015, 9 pages.
Related U.S. Patent Applications Form.

* cited by examiner

POLYARYLETHERKETONE COMPOSITION

RELATED APPLICATIONS

The present application claims priority to U.S. Provisional Application Ser. No. 62/039,972, filed on Aug. 21, 2014, which is incorporated herein in its entirety by reference thereto.

BACKGROUND OF THE INVENTION

Polyetheretherketone ("PEEK") is often used to fabricate parts for numerous engineering applications. Each application requires particular tensile and flexural properties, impact strength, heat distortion temperature, and resistance to warp. PEEK polymers are characterized by a high glass transition temperature, typically above 100° C., which makes them suitable for use in applications that require exposure to high temperatures. One drawback to these materials, however, is that they exhibit poor melt flow properties, which makes processing difficult. As such, a need continues to exist for high performance polymers with excellent melt flow properties.

SUMMARY OF THE INVENTION

In accordance with one embodiment of the present invention, a polymer composition is disclosed that comprises a polyaryletherketone and a liquid crystalline polymer that includes repeating units derived from naphthenic hydroxycarboxylic acids, naphthenic dicarboxylic acids, or a combination thereof in an amount of more than about 15 mol. % of the polymer.

Other features and aspects of the present invention are set forth in greater detail below.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polymer composition that contains a blend of a polyaryletherketone and a liquid crystalline polymer. Through selective control over the particular nature of the liquid crystalline polymer, the present inventors have discovered that the resulting composition can have a lower "high" shear melt viscosity, which enables the composition to exhibit better flow properties for use in a wide variety of applications. The high shear melt viscosity may, for instance, be reduced so that the ratio of the melt viscosity of the polymer composition to the initial melt viscosity of the polyaryletherketone may be about 0.98 or less, in some embodiments about 0.95 or less, in some embodiments, from about 0.01 to about 0.90, in some embodiments from about 0.02 to about 0.85, and in some embodiments, from about 0.05 to about 0.50. In one particular embodiment, the polymer composition may have a melt viscosity of about 165 Pa-s or less, in some embodiments from about 0.5 to about 150 Pa-s, and in some embodiments, from about 1 to about 125 Pa-s. Melt viscosity may be determined in accordance with ISO Test No. 11443 (equivalent to ASTM Test No. 1238-70) at a shear rate of 1000 seconds$^{-1}$ and temperature at least 20° C. above the melting temperature (e.g., 350° C., 370° C., or 390° C.).

In addition to exhibiting a decreased "high shear" melt viscosity, the present inventors have also surprisingly discovered that the "low shear" complex viscosity may actually be increased. An increased "low shear" complex viscosity can minimize drooling of the polymer composition during processing and also allow it to possess a greater melt strength, which facilitates its ability to be processed in a wide variety of applications without losing its physical integrity. In this regard, the ratio of the "low shear" complex viscosity to the "high shear" melt viscosity is generally very high, such as within a range of from about 50 to about 1000, in some embodiments from about 100 to about 800, and in some embodiments, from about 150 to about 500, wherein the low shear viscosity is determined by a parallel plate rheometer at an angular frequency of 0.15 radians per second, a temperature of 350° C., and at a constant strain amplitude of 1%. For instance, the polymer composition may have "low shear" complex viscosity of about 500 Pa-s or more, in some embodiments about 550 Pa-s or more, and in some embodiments, from about 600 to about 2,000 Pa-s.

To achieve the unique properties noted above, the nature of the liquid crystalline polymer is specifically tailored so that it is "naphthenic-rich", which generally means that the polymer contains a relatively high content of repeating units derived from naphthenic hydroxycarboxylic acids and naphthenic dicarboxylic acids, such as 2,6-naphthalenedicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically more than about 15 mol. %, in some embodiments more than about 20 mol. %, in some embodiments more than about 25 mol. %, and in some embodiments, from 25 mol. % to about 50 mol. % of the polymer. Without intending to be limited by theory, it is believed that such a high content of naphthenic repeating units can disrupt the linear nature of the polymer backbone, thereby helping the composition to achieve the desired degree of flow without having a substantial adverse impact on the mechanical properties.

The relative proportion of polyaryletherketone(s) and liquid crystalline polymer(s) in the composition may also be selected to help achieve the desired balance between viscosity and mechanical properties. More particularly, a high concentration of liquid crystalline polymers can result in a low melt viscosity, but too high of a content may reduce the viscosity to such an extent that it adversely impacts melt strength. In most embodiments, for example, liquid crystalline polymer(s) may be employed in an amount of from about 1 to about 60 parts, in some embodiments from about 2 to about 50 parts, and in some embodiments, from about 5 to about 30 parts by weight relative to 100 parts by weight of the polyaryletherketone(s). The liquid crystalline polymers may also constitute from about 0.5 wt. % to about 60 wt. %, in some embodiments from about 1 wt. % to about 50 wt. %, and in some embodiments, from about 5 wt. % to about 30 wt. % of the polymer composition. Polyaryletherketones may likewise constitute from about 40 wt. % to about 99.5 wt. %, in some embodiments from about 50 wt. % to about 99 wt. %, and in some embodiments, from about 70 wt. % to about 95 wt. % of the polymer composition.

Various embodiments of the present invention will now be described in more detail.

I. Polymer Composition

A. Polyaryletherketones

Polyaryletherketones are semi-crystalline polymers with a relatively high melting temperature, such as from about 300° C. to about 400° C., in some embodiments from about 310° C. to about 390° C., and in some embodiments, from about 330° C. to about 380° C. The glass transition temperature may likewise be about 100° C. or more, in some embodiments from about 110° C. to about 200° C., and in some embodiments, from about 130° C. to about 160° C. The melting and glass transition temperatures may be determined as is well known in the art using differential scanning calorimetry ("DSC"), such as determined by ISO Test No. 11357. Prior to combination with the liquid crystalline polymer, the initial polyaryletherketone may have a relatively high melt viscosity. In one particular embodiment, for example, the polyaryletherketone may have a melt viscosity of about 150 Pa-s or more, in some embodiments from about 155 to about 250 Pa-s, and in some embodiments, from about 160 to about 200 Pa-s, determined at a shear rate of 1000 seconds$^{-1}$. Melt viscosity may be determined in accordance with ISO Test No. 11443 (equivalent to ASTM Test No. 1238-70) at a temperature of 370° C.

Polyaryletherketones typically contain a moiety having the structure of Formula (I) and/or Formula (II):

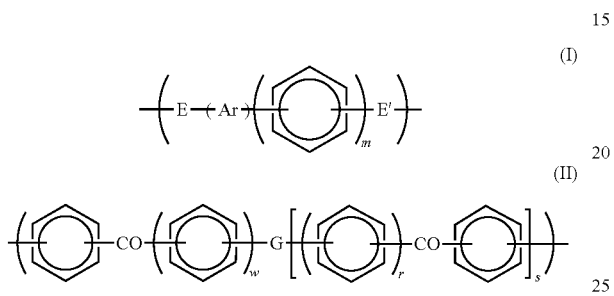

wherein, m and r are independently zero or a positive integer, in some embodiments from 0 to 3, in some embodiments from 0 to 2, and in some embodiments, 0 or 1;

s and w are independently zero or a positive integer, in some embodiments from 0 to 2, and in some embodiments, 0 or 1;

E and E' are independently an oxygen atom or a direct link;

G is an oxygen atom, a direct link, or —O-Ph-O— where Ph is a phenyl group; and

Ar is one of the following moieties (i) to (vi), which is bonded via one or more of phenyl moieties to adjacent moieties:

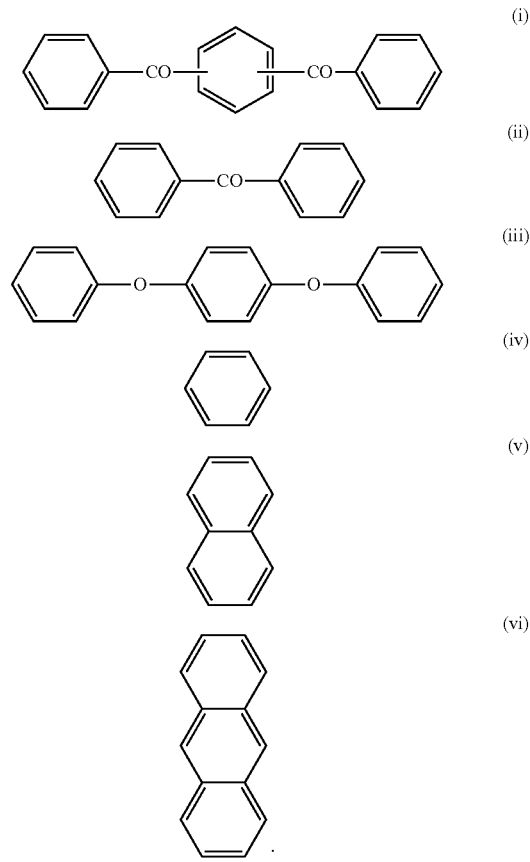

The polyaryletherketone may include more than one different type of repeat unit of Formula (I) and/or more than one different type of repeat unit of Formula (II). Typically, however, only one type of repeat unit of Formula (I) or Formula (II) is provided. In one particular embodiment, for example, the polyaryletherketone is a homopolymer or copolymer containing a repeat unit of the following general Formula (III):

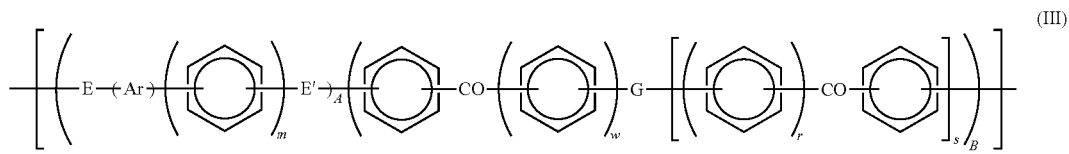

wherein,

A and B are independently 0 or 1; and

E, E', G, Ar, m, r, s and w are as described above.

In yet another embodiment, the polyaryletherketone is a homopolymer or copolymer containing a repeat unit of the following general Formula (IV):

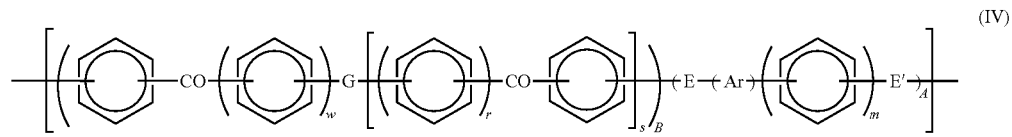

wherein,
A and B are independently 0 or 1; and
E, E', G, Ar, m, r, s and w are as described above.

Desirably, Ar in the embodiments above is selected from the following moieties (vii) to (xiii):

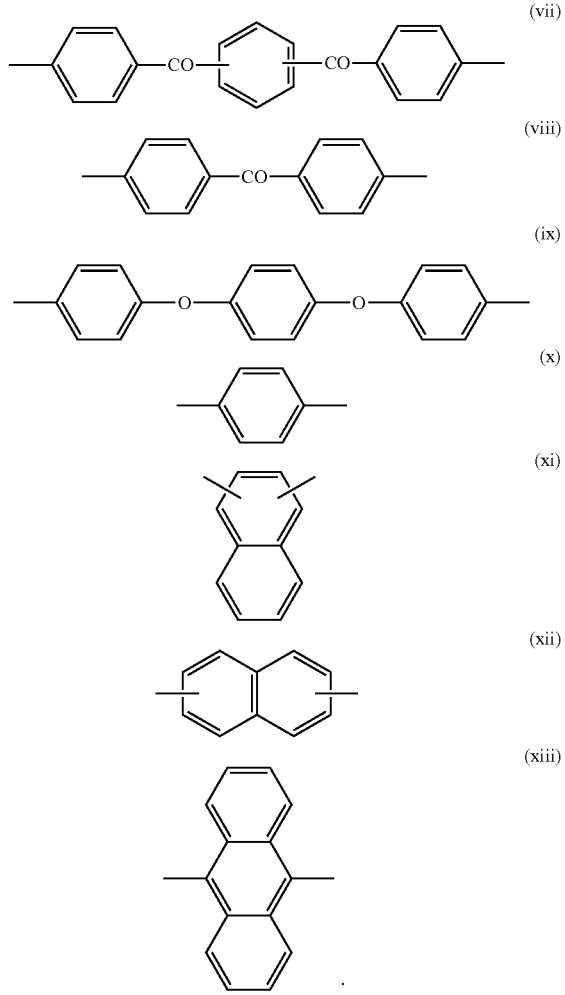

Particularly suitable polyaryletherketone polymers (or copolymers) are those of Formula (III) that primarily include phenyl moieties in conjunction with ketone and/or ether moieties. Examples of such polymers include polyetheretherketone ("PEEK") (wherein in Formula (III), Ar is moiety (iv), E and E' are oxygen atoms, m is 0, w is 1, G is a direct link, s is 0, and A and B are 1); polyetherketone ("PEK") (wherein in Formula (III), E is an oxygen atom, E' is a direct link, Ar is moiety (i), m is 0, A is 1, B is 0); polyetherketoneketone ("PEKK") (wherein in Formula (III), E is an oxygen atom, Ar is moiety (i), m is 0, E' is a direct link, A is 1, and B is 0); polyetherketoneetherketoneketone ("PEKEKK") (wherein in Formula (III), Ar is moiety (i), E and E' are oxygen atoms, G is a direct link, m is 0, w is 1, r is 0, s is 1, and A and B are 1); polyetheretherketoneketone ("PEEKK") (wherein in Formula (III), Ar is moiety (iv), E and E' are oxygen atoms, G is a direct link, m is 0, w is 0, and s, r, A and B are 1); polyether-diphenyl-ether-ether-diphenyl-ether-phenyl-ketone-phenyl (wherein in Formula (III), Ar is moiety (iv), E and E' are oxygen atoms, m is 1, w is 1, A is 1, B is 1, r and s are 0, and G is a direct link); as well as blends and copolymers thereof.

B. Liquid Crystalline Polymer

The liquid crystalline polymer used in the composition of the present invention is generally classified as a "thermotropic" polymer to the extent that it can possess a rod-like structure and exhibit a crystalline behavior in its molten state (e.g., thermotropic nematic state). In one particular embodiment, the liquid crystalline polymer is an aromatic polyester that contains aromatic ester repeating units generally represented by the following Formula (V):

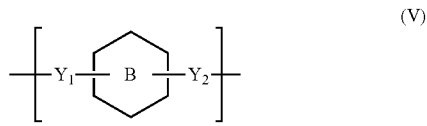

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O), wherein at least one of $Y_1$ and $Y_2$ are C(O).

Examples of aromatic ester repeating units that are suitable for use in the present invention may include, for instance, aromatic dicarboxylic repeating units ($Y_1$ and $Y_2$ in Formula V are C(O)), aromatic hydroxycarboxylic repeating units ($Y_1$ is O and $Y_2$ is C(O) in Formula V), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, 2,6-naphthalenedicarboxylic acid ("NDA"), terephthalic acid ("TA"), and isophthalic acid ("IA"). When employed, for instance, NDA may constitute from about 15 mol. % to about 50 mol. %, in some embodiments from about 20 mol. % to about 45 mol. %, and in some embodiments, from 25 mol. % to about 40 mol. % of the polymer, while TA and/or IA may constitute from about 0.1 mol. % to about 15 mol. %, in some embodiments from about 0.2 mol. % to about 10 mol. %, and in some embodiments, from about 0.5 mol. % to about 5% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 6-hydroxy- 2-naphthoic acid ("HNA") and 4-hydroxybenzoic acid ("HBA"). When employed, for instance, HNA may constitute from about 15 mol. % to about 50 mol. %, in some embodiments from about 20 mol. % to about 45 mol. %, and in some embodiments, from 25 mol. % to about 40 mol. % of the polymer, while HBA may constitute from about 5 mol. % to about 60 mol. %, in some embodiments from about 10 mol. % to about 50 mol. %, and in some embodiments, from about 20 mol. % to about 40% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 5 mol. % to about 60 mol. %, in some embodiments from about 10 mol. % to about 50 mol. %, and in some embodiments, from about 20 mol. % to about 40% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids (e.g., cyclohexane dicarboxylic acid), diols, amides, amines, etc. Of course, in other embodiments, the polymer may be "wholly aromatic" in that it lacks repeating units derived from non-aromatic (e.g., aliphatic or cycloaliphatic) monomers.

The liquid crystalline polymer may be prepared by initially introducing the aromatic monomer(s) used to form the ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggaoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming the liquid crystalline polymer may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder. While unnecessary, it should also be understood that a subsequent solid phase polymerization may be conducted to further increase molecular weight. When carrying out solid-phase polymerization on a polymer obtained by melt polymerization, it is typically desired to select a method in which the polymer obtained by melt polymerization is solidified and then pulverized to form a powdery or flake-like polymer, followed by performing solid polymerization method, such as a heat treatment in a temperature range of 200° C. to 350° C. under an inert atmosphere (e.g., nitrogen).

Regardless of the particular method employed, the resulting liquid crystalline polymer may have a relatively high melting temperature. For example, the melting temperature of the polymer may be from about 250° C. to about 450° C., in some embodiments from about 280° C. to about 420° C., in some embodiments from about 290° C. to about 400° C., and in some embodiments, from about 300° C. to about 400° C. Of course, in some cases, the polymer may not exhibit a distinct melting temperature when determined according to conventional techniques (e.g., DSC). The polymer may also have a melt viscosity of from about 20 Pa-s to about 600 Pa-s, in some embodiments from about 50 Pa-s to about 550 Pa-s, and in some embodiments, from about 75 to about 500 Pa-s, as determined at a shear rate of 1000 seconds$^{-1}$ and temperatures at least 20° C. above the melting temperature (e.g., 320° C., 350° C., or 370° C.) in accordance with ISO Test No. 11443 (equivalent to ASTM Test No. 1238-70). Further, the polymer typically has a number average molecular weight ($M_n$) of about 2,000 grams per mole or more, in some embodiments from about 4,000 grams per mole or more, and in some embodiments, from about 5,000 to about 50,000 grams per mole. Of course, it is also possible to form polymers having a lower molecular weight, such as less than about 2,000 grams per mole, using the method of the present invention. The intrinsic viscosity of the polymer, which is generally proportional to molecular weight, may also be relatively high. For example, the intrinsic viscosity may be about 1 deciliter per gram ("dL/g") or more, in some embodiments about 2 dL/g or more, in some embodiments from about 3 to about 20 dL/g, and in some embodiments from about 4 to about 15 dL/g. Intrinsic viscosity may be determined in accordance with ISO-1628-5 using a 50/50 (v/v) mixture of pentafluorophenol and hexafluoroisopropanol, as described in more detail below.

C. Other Components

If desired, the polymer composition may also be combined with a wide variety of other types of components. For example, a filler material may be incorporated into the polymer composition to form a filled composition with enhanced strength and/or surface properties. A filled polymer composition can include, for example, a mineral filler and/or a fiber filler optionally in conjunction with one or more other additives as are generally known in the art.

Fibers may be employed as a filler material to improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulative property, which is often desirable for use in electronic components, the high strength fibers may be formed from materials that are also generally insulative in nature, such as glass, ceramics (e.g., alumina or silica), aramids (e.g., Kevlar® marketed by E. I. du Pont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

The relative amount of the fibers in the polymer composition may also be selectively controlled to help achieve the desired mechanical properties without adversely impacting other properties of the composition, such as its flowability. For example, when employed, the fibers may constitute from about 5 wt. % to about 40 wt. %, in some embodiments from about 10 wt. % to about 35 wt. %, and in some embodiments, from about 15 wt. % to about 30 wt. % of the filled polymer composition. Although the fibers may be employed within the ranges noted above, the present inventors have surprisingly discovered that the desired mechanical properties can be achieved with little to no fibers present. Thus, in certain embodiments, the polymer composition may be substantially free of such fibers such that they constitute about 5 wt. % or less, in some embodiments about 3 wt. % or less, and in some embodiments, from 0 wt. % to about 2 wt. % (e.g., 0 wt. %) of the polymer composition.

Mineral fillers may be employed to help achieve the desired mechanical properties and/or appearance. When employed, mineral fillers typically constitute from about 5 wt. % to about 60 wt. %, in some embodiments from about 10 wt. % to about 55 wt. %, and in some embodiments, from about 20 wt. % to about 50 wt. % of the filled polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite ($(K, H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite ($(MgFe,Al)_3(Al,Si)_4O_{10}(OH)_2 \cdot 4H_2O$), palygorskite ($(Mg, Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Still other additives that can be included in the filled polymer composition may include, for instance, antimicrobials, pigments (e.g., carbon black), antioxidants, stabilizers, surfactants, waxes, solid solvents, and other materials added to enhance properties and processability. Lubricants, for instance, may be employed in the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

II. Method for Forming the Polymer Composition

The manner in which the polymers are combined may vary as is known in the art. For instance, the raw materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the polyaryletherketone and liquid crystalline polymer may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 200° C. to about 500° C., and in some embodiments, from about 250° C. to about 400° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

The resulting polymer composition may exhibit a relatively high glass transition temperature. For example, the glass transition temperature of the polymer composition may be about 50° C. or more, in some embodiments about 70° C. or more, in some embodiments from about 80° C. to about 260° C., and in some embodiments, from about 90° C. to about 200° C. The melting temperature may also be about 300° C. to about 400° C., in some embodiments from about 310° C. to about 390° C., and in some embodiments, from about 330° C. to about 380° C. The glass transition and melting temperatures may be determined as is well known in the art using differential scanning calorimetry ("DSC"), such as determined by ISO Test No. 11357.

The present inventors have also discovered that the rate of crystallization of the polymer composition, as measured by its "crystallization half-time", is relatively fast. For example, the polymer composition may have a crystallization half-time of about 45 minutes or less, in some embodiments from about 1 minutes to about 40 minutes, and in some embodiments, from about 5 minutes to about 35 minutes, determined at a temperature of 330° C. To the contrary, conventional polyaryletherketones often have a crystallization half-time greater than 45 minutes. The polymer composition may also have a crystallization temperature ("Tc") of from about 200° C. to about 400° C., in some embodiments from about 250° C. to about 350° C., and in some embodiments, from about 280° C. to about 320° C. The crystallization half-time and crystallization temperature may be determined using differential scanning calorimetry ("DSC") as is well known to those skilled in the art and described in more detail below.

In addition, the polymer composition may also exhibit excellent strength properties. In fact, in certain embodiments, the polymer composition may actually exhibit better strength than can be achieved by the polyaryletherketone alone. By way of example, the polymer composition may have a tensile strength of about 30 Megapascals ("MPa") or more, in some embodiments about 40 MPa or more, and in some embodiments, from about 50 to about 250 MPa, as well as a tensile modulus of about 30 MPa or more, in some embodiments about 40 MPa or more, and in some embodiments, from about 50 to about 250 MPa. Tensile properties can be determined according to ISO Test No. 527 (technically equivalent to ASTM D638) at a temperature of 23° C. and at a test speed of 5 mm/min. The polymer composition may also have a flexural modulus of about 30 MPa or more, in some embodiments about 35 MPa or more, and in some embodiments, from about 40 to about 150 MPa, as determined according to ISO Test No. 178 (technically equivalent to ASTM D790) at a temperature of 23° C. The polymer composition may have a notched Charpy impact strength of about 2 kJ/m$^2$ or more, in some embodiments about 3 kJ/m$^2$ or more, and in some embodiments, from about 4 to about 10 kJ/m$^2$ as determined according to ASTM D256, Method B (technically equivalent to ISO 179-1) at 23° C. Furthermore, the polymer composition may have a deflection temperature under load ("DTUL") of about 130° C. or more, in some embodiments about 140° C. or more, and in some embodiments, from about 145° C. to about 250° C., as determined according to ASTM D648-07 (technically equivalent to ISO Test No. 75-2) at a specified load of 1.8 MPa.

Once formed, the polymer composition may be shaped into a variety of different products, such as fibers, molded articles (e.g., injection molded, compression molded, etc.), films, pultruded parts (e.g., profiles, rods, etc.), and so forth. For example, the polymer composition, which possesses the unique combination of high flowability and good mechanical properties, may be particularly well suited for parts having a small dimensional tolerance. Such parts, for example, generally contain at least one micro-sized dimension (e.g., thickness, width, height, etc.), such as from about 500 micrometers or less, in some embodiments from about 50 to about 450 micrometers, and in some embodiments, from about 100 to about 400 micrometers. In one particular embodiment, for instance, an electronic component, such as a connector or compact camera module, may incorporate the part. Some examples of products that may contain such electronic components include, for instance, cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, battery covers, speakers, camera modules, integrated circuits (e.g., SIM cards), housings for electronic devices, electrical controls, circuit breakers, switches, power electronics, printer parts, etc.

The present invention may be better understood with reference to the following examples.

Test Methods

Melt Viscosity: The melt viscosity (Pa-s) may be determined in accordance with ISO Test No. 11443:2005 (or ASTM D3835) at a shear rate of 1000 $s^{-1}$ and temperature of, for example, 320° C., 350° C., 370° C., or 390° C., using a Dynisco 7001 capillary rheometer. The temperature may vary as is known in the art depending on the melting temperature of the polymer. For this test, the rheometer orifice (die) may have a diameter of 1 mm, length of 20 mm, L/D ratio of 20.1, and an entrance angle of 180°. The diameter of the barrel may also be 9.55 mm±0.005 mm and the length of the rod may be 233.4 mm.

Complex Viscosity: The complex viscosity is used herein as an estimate for the "low shear" viscosity of the polymer composition at low frequencies. Complex viscosity is a frequency-dependent viscosity, determined during forced harmonic oscillation of shear stress at angular frequencies of 0.15 and 500 radians per second. Measurements may be determined at a constant temperature of 350° C. and at a constant strain amplitude of 1% using an ARES-G2 rheometer (TA Instruments) with a parallel plate configuration (25 mm plate diameter).

Glass Transition Temperature, Melting Temperature, and Crystallization Temperature: The glass transition and crystalline temperature ("Tg") may be determined by differential scanning calorimetry ("DSC") as is known in the art and described in ISO Test No. 11357. For crystalline or semicrystalline materials, the melting temperature ("Tm") may also be determined as the differential scanning calorimetry (DSC) peak melt temperature. Under the DSC procedure, samples may be heated and cooled at 20° C. per minute as stated in ISO Standard 10350 using DSC measurements conducted on a TA Q2000 Instrument.

Deflection Under Load Temperature ("DTUL"): The deflection under load temperature may be determined in accordance with ISO Test No. 75-2 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2).

Tensile Properties: Tensile properties may be tested according to ISO Test No. 527 (technically equivalent to ASTM D638). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Properties: Flexural properties may be tested according to ISO Test No. 178 (technically equivalent to ASTM D790). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength: Notched Charpy properties may be tested according to ISO Test No. ISO 179-1) (technically equivalent to ASTM D256, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Crystallization Properties: The isothermal crystallization half time may be determined by differential scanning calorimetry (DSC), such as in accordance with ASTM D-3418-12e1. The half time of crystallization may be determined by melting the sample, quenching the sample from the melt as rapidly as possible in the DSC to a preset temperature, maintaining the sample at that temperature, and allowing the sample to crystallize isothermally. Tests may be performed at various temperatures, such as 315° C. or 330° C. Heat generation may be measured as a function of time while the sample crystallized. The area under the peak may be measured and the time which divides the peak into two equal areas may be defined as the half-time of crystallization. In other words, the area under the peak may be measured and divided into two equal areas along the time scale. The elapsed time corresponding to the time at which half the area of the peak is reached is defined as the half-time of crystallization. The shorter the time, the faster the crystallization rate at a given crystallization temperature.

EXAMPLE 1

Three polymers (LCP 1, LCP 2, and LCP 3) with different molecular weights may be synthesized according to the following procedure. A 2 L flask is charged with HBA (253.2 g), NDA (376.6 g), TA (15.3 g), HQ (201.9 g), 56 mg of potassium acetate, 373 mg of magnesium acetate, and 600 mg of Sandostab stabilizer. The flask is equipped with C-shaped stirrer, thermal couple, gas inlet, and distillation head. The flask is placed under a low nitrogen purge and acetic anhydride (99.7% assay, 628.5 g) is added. The milky-white slurry is agitated at 75 rpm and heated to 140° C. over the course of 95 minutes using a fluidized sand bath. After this time, the mixture is gradually heated to 370° C. steadily over 290 minutes. Reflux is seen once the reaction exceeds 140° C. and the overhead temperature is increased to approximately 115° C. as acetic acid byproduct was removed from the system. During the heating, the mixture grows yellow and slightly more viscous and the vapor temperature gradually drops to 90° C. Once the mixture reaches 370° C., the nitrogen flow is stopped. The flask is evacuated under vacuum and the agitation is slowed to 30 rpm. As the time under vacuum progresses, the mixture grows viscous. The reaction is stopped by releasing the vacuum and stopping the heat flow to the reactor, when a predetermined torque reading is observed. The flask is cooled and the resulting polymer is recovered as a solid, dense yellow plug. Sample for analytical testing is obtained by mechanical size reduction. The polymers have a melting point of about 345-350° C. as measured by DSC analysis.

EXAMPLE 2

To form a polymer composition in accordance with an exemplary embodiment of the present invention, the liquid crystalline polymers of Example 1 (LCP 1, 2, and 3) may be blended with VICTREX™ 150G, a commercial grade of polyetheretherketone ("PEEK") available from Victrex. More particularly, the polymers may be initially dried overnight in an oven at 130° C., mixed in a drum tumbler, and thereafter extruded through an 18-mm extruder having the following temperature profile along the screw: Zone 1 temp: 360° C.C, Zone 2 temp: 360° C., Zone 3 temp: 370° C., and Zone 4 temp: 380° C. The screw speed may be 300 RPM and the die pressure may be 240-250 psi.

Once formed, the melt viscosity and complex viscosity of the resulting samples are tested. The results are set forth below.

TABLE 1

Melt Viscosity at Shear Rate of 1000 $s^{-1}$ and Temperatures of 350° C., 360° C., 370° C., and 380° C.

| Temp (° C.) | PEEK | PEEK + 10% LCP 1 | PEEK + 20% LCP 1 | PEEK + 10% LCP 2 | PEEK + 20% LCP 2 | PEEK + 10% LCP 3 | PEEK + 20% LCP 3 |
|---|---|---|---|---|---|---|---|
| 350 | 225.1 | 129.9 | 49.6 | 398.4 | 255.8 | 410.4 | 319.2 |
| 360 | 193.1 | 85.6 | 55.1 | 104.6 | 75.9 | 104.9 | 83.5 |
| 370 | 180.4 | 91.1 | 43.3 | 112 | 75.0 | 115.7 | 84.0 |
| 380 | 163.3 | 69.7 | 37.9 | 88.4 | 59.7 | 83.5 | 73.6 |

TABLE 2

Melt Viscosity at Shear Rate of 0.1 $s^{-1}$

| | PEEK | PEEK + 10% LCP 1 | PEEK + 20% LCP 1 | PEEK + 10% LCP 2 | PEEK + 20% LCP 2 | PEEK + 10% LCP 3 | PEEK + 20% LCP 3 |
|---|---|---|---|---|---|---|---|
| Complex Viscosity at 370° C. (Pa-s) | 526.0 | 558.4 | 648.7 | 638.4 | 794.4 | 628.6 | 752.5 |

As indicated, a substantial melt viscosity reduction (increase in the flow) can be achieved through the addition of the liquid crystalline polymer. Moreover, the low shear complex viscosity can actually increase.

The crystallization properties of the samples are also tested. The results are set forth below.

TABLE 3

Crystallization Properties

| | Peak Crystallization Temp (° C.) | Peak Melting Temp (° C.) | % Crystallinity | Isothermal Crystallization Half-Time @ 315° C. (min) | Isothermal Crystallization Half-Time @ 330° C. (min) |
|---|---|---|---|---|---|
| PEEK | 295.8 | 341.3 | 38.0 | 2.75 | 46.89 |
| PEEK + 10% LCP 1 | 300.2 | 341.2 | 39.2 | 1.18 | 29.09 |
| PEEK + 20% LCP 1 | 299.1 | 341.3 | 39.5 | 1.30 | 31.44 |
| PEEK + 10% LCP 2 | 298.9 | 340.8 | 37.7 | 1.30 | 31.99 |
| PEEK + 20% LCP 2 | 298.0 | 341.2 | 38.4 | 1.43 | 33.33 |
| PEEK + 10% LCP 3 | 297.7 | 342.0 | 38.2 | 1.34 | 32.10 |
| PEEK + 20% LCP 3 | 297.5 | 342.0 | 38.5 | 1.40 | 33.16 |

As indicated by the isothermal half-times, the polymer compositions of the present invention were able to achieve a much faster crystallization rate than the sample containing only PEEK.

Several of the pellet samples are also injection molded to obtain specimen samples for tensile, impact, flexural and heat distortion temperature measurements. The results are set forth below.

| | PEEK | PEEK + 10% LCP 1 | PEEK + 20% LCP 1 | PEEK + 10% LCP 2 | PEEK + 20% LCP 2 | PEEK + 10% LCP 3 | PEEK + 20% LCP 3 |
|---|---|---|---|---|---|---|---|
| Flexural Modulus (MPa) | 3,898 | 4,114 | 4,489 | 4,430 | 4,763 | 4,437 | 4,935 |
| Flexural Break Stress (MPa) | — | 124.46 | 105.44 | — | — | — | 115 |
| Tensile Modulus (MPa) | 4250 | 4248 | 4471 | 4509 | 4724 | 4571 | 5070 |

-continued

| | PEEK | PEEK + 10% LCP 1 | PEEK + 20% LCP 1 | PEEK + 10% LCP 2 | PEEK + 20% LCP 2 | PEEK + 10% LCP 3 | PEEK + 20% LCP 3 |
|---|---|---|---|---|---|---|---|
| Tensile Break Stress (MPa) | 82 | 88 | 69 | 95 | 75 | 97 | 75 |
| Tensile Break Strain (%) | 10.0 | 3.0 | 2.0 | 3.9 | 2.0 | 3.9 | 1.9 |
| Charpy Notched Impact Strength (kJ/m$^2$) | 3.1 | 3.4 | 4.2 | 3.2 | 7 | 3.2 | 3 |
| DTUL (° C.) | 154 | 153 | 161 | 162 | 166 | 163 | 176 |

The polymer composition of the present invention is capable of achieving even better mechanical properties than is observed for PEEK alone.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising a polyaryletherketone and a liquid crystalline polymer that comprises repeating units derived from naphthenic hydroxycarboxylic acids, naphthenic dicarboxylic acids, or a combination thereof in an amount of more than about 15 mol. % of the polymer.

2. The polymer composition of claim 1, wherein the repeating units derived from naphthenic hydroxycarboxylic acids, naphthenic dicarboxylic acids, or a combination thereof constitute from about 25 mol. % to about 50 mol. % of the liquid crystalline polymer.

3. The polymer composition of claim 1, wherein the liquid crystalline polymer contains 2,6-naphthalenedicarboxylic acid in an amount of from about 15 mol. % to about 50 mol. %.

4. The polymer composition of claim 1, wherein the liquid crystalline polymer further comprises repeating units derived from 4-hydroxybenzoic acid.

5. The polymer composition of claim 1, wherein the liquid crystalline polymer further comprises repeating units derived from hydroquinone, 4,4-biphenol, or a combination thereof.

6. The polymer composition of claim 1, wherein the polyaryletherketone has a glass transition temperature of from about 130° C. to about 230° C.

7. The polymer composition of claim 1, wherein the polyaryletherketone has a melt viscosity of about 150 Pa·s or more, as determined in accordance with ISO Test No. 11443 at a shear rate of 1000 s$^{-1}$ and temperature of 370° C.

8. The polymer composition of claim 1, wherein the polyaryletherketone contains a moiety having the structure of Formula (I) and/or Formula (II):

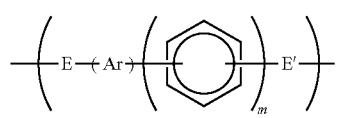

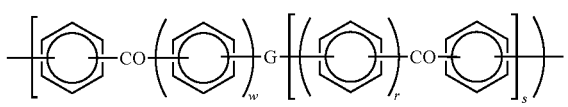

wherein, m and r are independently zero or a positive integer;

s and w are independently zero or a positive integer;

E and E' are independently an oxygen atom or a direct link;

G is an oxygen atom, a direct link, or —O-Ph-O— where Ph is a phenyl group; and

Ar is one of the following moieties (i) to (vi), which is bonded via one or more of phenyl moieties to adjacent moieties:

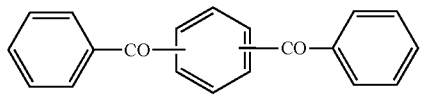

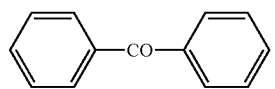

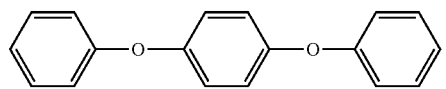

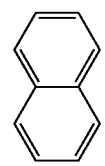

9. The polymer composition of claim 8, wherein the polyaryletherketone contains a repeat unit of the following general Formula (III):

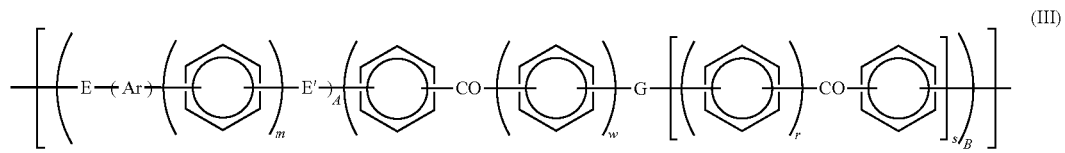

wherein,
A and B are independently 0 or 1.

10. The polymer composition of claim 8, wherein the polyaryletherketone contains a repeat unit of the following general Formula (IV);

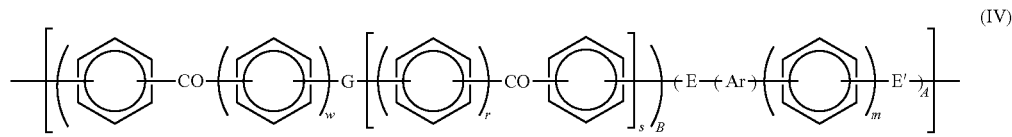

wherein,
A and B are independently 0 or 1.

11. The polymer composition of claim 1, wherein the polyaryletherketone is polyetheretherketone, polyetherketone, polyetherketoneketone, polyetherketoneetherketoneketone, polyetheretherketoneketone, polyether-diphenyl-ether-ether-diphenyl-ether-phenyl-ketone-phenyl, or a blend or copolymer thereof.

12. The polymer composition of claim 1, wherein liquid crystalline polymers constitute from about 1 to about 60 parts relative to 100 parts by weight of polyaryletherketones in the composition.

13. The polymer composition of claim 1, wherein liquid crystalline polymers constitute from about 0.5 wt. % to about 60 wt, % of the polymer composition.

14. The polymer composition of claim 1, wherein polyaryletherketones constitute from about 40 wt. % to about 99.5 wt. % of the polymer composition.

15. The polymer composition of claim 1, wherein the ratio of the melt viscosity of the polymer composition to the melt viscosity of the polyaryletherketone is about 0.98 or less.

16. The polymer composition of claim 1, wherein the melt viscosity of the polymer composition is about 165 Pa-s or less, as determined in accordance with ISO Test No. 11443 at a shear rate of 1000 s$^{-1}$ and temperature of 370° C.

17. The polymer composition of claim 1, wherein the melt viscosity of the polymer composition is from about 1 to about 125 Pa-s, as determined in accordance with ISO Test No. 11443 at a shear rate of 1000 s$^{-1}$ and temperature of 370° C.

18. The polymer composition of claim 1, wherein the ratio of the complex viscosity to the melt viscosity of the polymer composition is from about 50 to about 1000, the complex viscosity being determined with a parallel plate rheometer at an angular frequency of 0.15 radians per second, temperature of 350° C., and at a constant strain amplitude of 1%, and the melt viscosity being determined in accordance with ISO Test No. 11443 at a shear rate of 1000 s$^{-1}$ and temperature of 370° C.

19. The polymer composition of claim 1, wherein the complex viscosity of the polymer composition is about 500 Pa-s or more, as determined with a parallel plate rheometer at an angular frequency of 0.15 radians per second, temperature of 350° C., and at a constant strain amplitude of 1%.

20. The polymer composition of claim 1, wherein the crystallization half-time of the composition is about 45 minutes or less, determined at a temperature of 330° C.

21. The polymer composition of claim 1, wherein the polyetherketone has a melt viscosity of from about 155 to about 250 Pa-s, as determined in accordance with ISO Test No. 11443 at a shear rate of 1000 s$^{-1}$ and temperature of 370° C.

22. The polymer composition of claim 1, wherein liquid crystalline polymers are employed in an amount of from about 5 to about 30 parts by weight relative to 100 parts by weight of polyaryletherketones in the composition.

23. The polymer composition of claim 1, wherein polyaryletherketones constitute from about 50 wt. % to about 99 wt. % of the polymer composition.

* * * * *